(12) United States Patent
Kobayashi et al.

(10) Patent No.: US 11,505,043 B2
(45) Date of Patent: Nov. 22, 2022

(54) SHOCK ABSORBER (71) Applicants: Toyota Jidosha Kabushiki Kaisha, Toyota (JP); Toyota Boshoku Kabushiki Kaisha, Kariya (JP)

(72) Inventors: Isao Kobayashi, Okazaki (JP); Kyousuke Ii, Seto (JP); Yasuomi Tanaoka, Chiryu (JP)

(73) Assignees: TOYOTA JIDOSHA KABUSHIKI KAISHA, Toyota (JP); TOYOTA BOSHOKU KABUSHIKI KAISHA, Kariya (JP)

( * ) Notice: Subject to any disclaimer, the term of this patent is extended or adjusted under 35 U.S.C. 154(b) by 728 days.

(21) Appl. No.: 16/514,787

(22) Filed: Jul. 17, 2019

(65) Prior Publication Data

US 2020/0023721 A1 Jan. 23, 2020

(30) Foreign Application Priority Data

Jul. 20, 2018 (JP) .............................. JP2018-137183

(51) Int. Cl.
*B60J 5/04* (2006.01)
*F16F 7/00* (2006.01)
*F16F 7/12* (2006.01)
*B60R 13/02* (2006.01)

(52) U.S. Cl.
CPC .......... *B60J 5/0461* (2013.01); *B60J 5/0451* (2013.01); *B60J 5/0455* (2013.01); *F16F 7/003* (2013.01); *F16F 7/12* (2013.01); *B60R 13/0243* (2013.01); *B60R 2013/0287* (2013.01); *F16F 2224/0233* (2013.01); *F16F 2236/04* (2013.01)

(58) Field of Classification Search
CPC ...... B60J 5/0461; B60J 5/0451; B60J 5/0455; F16F 7/003; F16F 7/12; F16F 2224/0233; F16F 2236/04; B60R 13/0243; B60R 2013/0287; B60R 21/0428
USPC ......................................................... 296/153
See application file for complete search history.

(56) References Cited

U.S. PATENT DOCUMENTS

| 8,196,979 | B2 * | 6/2012 | Ralston .................. B60R 19/18 293/121 |
| 8,864,218 | B2 * | 10/2014 | Hamada ................... B60Q 3/51 296/214 |
| 10,604,098 | B1 * | 3/2020 | Perez Lecuona ... B60R 13/0256 |
| 10,632,935 | B2 * | 4/2020 | Shioda ............... B60R 13/0243 |
| 2012/0049546 | A1 | 3/2012 | Chickmenahalli et al. |

(Continued)

FOREIGN PATENT DOCUMENTS

| EP | 1352791 A1 | 10/2003 |
| JP | H06270675 A | 9/1994 |
| JP | H07186721 A | 7/1995 |

(Continued)

*Primary Examiner* — Pinel E Romain
(74) *Attorney, Agent, or Firm* — Dinsmore & Shohl LLP (57) ABSTRACT

Stability of shock absorbing property of a shock absorber provided on a back surface of a door trim is improved. A shock absorber is attached on the back surface of the door trim, and absorbs impact applied to the door. A quadrangular tube element of the shock absorber has an end plate on a tube tip surface, and faces the back surface of the door trim. The quadrangular tube element has an approximate U shape in which three side surfaces are closed by an upper plate, a lower plate, and a front plate, and the remaining one side surface is opened.

4 Claims, 7 Drawing Sheets

(56) References Cited

U.S. PATENT DOCUMENTS

2015/0035310 A1* 2/2015 Yamaguchi ......... B60R 13/0206
296/153
2018/0111454 A1 4/2018 Arimoto et al.

FOREIGN PATENT DOCUMENTS

| JP | 2003-306110 A | 10/2003 | | |
|---|---|---|---|---|
| JP | 2013-107442 A | 6/2013 | | |
| JP | 2018-069857 A | 5/2018 | | |
| JP | 2018068915 A | * | 5/2018 | |
| WO | WO-2017203120 A1 | * | 11/2017 | ............ B60J 5/0455 |
| WO | WO-2019026967 A1 | * | 2/2019 | |
| WO | WO-2021070327 A1 | * | 4/2021 | ......... B60R 21/0428 |
| WO | WO-2022004221 A1 | * | 1/2022 | |

\* cited by examiner

SHOCK ABSORBER

CROSS REFERENCE TO RELATED APPLICATION

This application claims priority to Japanese Patent Application No. 2018-137183 filed on Jul. 20, 2018, which is incorporated herein by reference in its entirety including the specification, claims, drawings, and abstract.

TECHNICAL FIELD

The present disclosure relates to a shock absorber (impact absorber) which is provided inside a door of a vehicle.

BACKGROUND

A shock absorber may be provided inside a vehicle door. For example, JP 2013-107442 A and JP 2018-69857 A disclose configurations in which a shock absorber is attached to a back surface of a door trim at a lower and rear side of the door.

The shock absorber of JP 2013-107442 A is formed from a resin, and four plate-shaped ribs which extend approximately perpendicularly from a flat plate-shaped base plate are placed in a cross shape. Movements of these ribs are restricted so that the ribs incline in a same rotational direction with respect to a center of the cross shape. The shock absorber further has legs having a prism shape at four corners of the base plate, and the tips of the legs are thermally welded to the door trim so that the shock absorber is coupled to the door trim. On a pair of side walls of the prism of the leg, a through hole is formed, and a side wall on which the through hole is provided is selected according to a direction of inclination of the rib.

JP 2018-69857 A describes a shock absorber which appears to be made of a resin. In this shock absorber, four plate-shaped hard walls which extend approximately perpendicularly from a base plate having a certain thickness are placed in a cross shape. These hard walls are inserted into grooves formed on a door trim, so that relative movement with respect to the door trim is restricted. Further, legs having an L shape cross section are provided at four corners of the base plate. A bending part which can easily deform is provided on the leg, and, during a collision, the leg is quickly bent, and then, the four hard walls absorb the impact force.

In the shock absorber described in JP 2013-107442 A, the plate-shaped ribs extend toward the side of the door trim approximately perpendicularly, and there may be cases where, during the collision, the rib is not inclined in the intended direction. Because of this, the rib may deform in various manners, and variation may be caused in the shock absorbing property.

In the shock absorber described in JP 2018-69857 A, the hard wall is fixed on the door trim. Because of this, similar to JP 2013-107442 A, the hard wall may deform in various manner, and variation may be caused in the shock absorbing property.

An advantage of the present disclosure lies in improvement of stability of the shock absorbing property of the shock absorber provided on a back surface of the door trim.

SUMMARY

According to one aspect of the present disclosure, there is provided a shock absorber which is attached to a back surface of a door trim of a vehicle door and which absorbs impact applied to the vehicle door, comprising; an approximate quadrangular tube element having a tube tip surface facing the back surface of the door trim, wherein the approximate quadrangular tube element has an approximate U shape in which three side surfaces are closed by an upper plate, a lower plate, and a front plate or a rear plate, and the remaining side surface is opened.

The shock absorber is a member which is attached to the back surface of the vehicle door trim and which absorbs energy of impact applied to the vehicle door. The attachment of the shock absorber may be realized by attaching the tube tip surface to the door trim back surface, or may alternatively be realized by separately having a leg for attachment or the like and attaching the leg to the door trim back surface.

The approximate quadrangular tube element of the shock absorber has the tube tip surface facing the door trim back surface. In a situation where no impact is applied, the tube tip surface and the door trim back surface may be coupled to each other, or may be in a simple contact state, or in a separated state. In any case, when an impact is applied from the outside to the door during side collision or the like, the door deforms due to the impact, and the tube tip surface is consequently firmly pressed against the door trim back surface.

In this process, because the approximate quadrangular tube element has the U shape, in comparison to a case where the element is a simple, single-plate shape, a mode of deformation is limited, and the element is stably deformed and collapsed. An impact load which is input to the door may vary depending on the direction of the collision, but the approximate quadrangular tube element can substantially stably deform during applications of various impact loads.

Terms will now be described. The door trim is a member which is attached to a vehicle door at a side of a cabin, and which covers a part or all of the door. The door trim is produced in consideration of the design. A back surface of the door trim refers not to the side of the cabin, but to a side facing an inner side of the door.

An approximate quadrangular tube element refers to a tube shape with a cross section having a shape of a quadrangle or a shape which can be approximated as a quadrangle. For example, the shape includes a shape in which one or more sides have slight roundness and a shape in which one or more corners have roundness. The approximate quadrangular tube element is provided in such a manner that four side surfaces are placed at an upper side, a lower side, a front side, and a rear side of the vehicle. An upper plate, a lower plate, a front plate, and a rear plate respectively refer to plates forming the side surfaces on the upper side, the lower side, the front side, and the rear side. Because of this, the upper plate and the lower plate are placed substantially horizontally (which refers to a configuration where an inclination in a front-and-rear direction of a plane is within ±20 degrees, and more specifically, within ±10 degrees, with respect to the horizontal plane; with regard to a vehicle width direction, an inclination corresponding to an approximate truncated chevron shape as will be described later may be present, for example, and the inclination may be larger compared to that in the front-and-read direction). The front plate and the vertical plate are placed substantially perpendicularly (which refers to a configuration where an angle with a vertical direction is within ±20 degrees, and more specifically, within ±10 degrees).

According to another aspect of the present disclosure, in the approximate quadrangular tube element, the upper plate and the lower plate are formed in an approximate truncated chevron shape in which a distance therebetween becomes smaller toward the tube tip surface. That is, the distance between the upper plate and the lower plate is closer at the tube tip surface than at the other end surface. In other words, the front plate or the rear plate and the open surface are formed in a shape with the width of the tube tip surface being narrowed. In this approximate quadrangular tube element, when the impact load is applied, first, the upper plate and the lower plate deform to widely open the open surface, and are compressed in an axial direction of the tube (direction connecting the ends of the tube). As a result, the approximate quadrangular element deforms to protrude in a direction opposite from the open surface. For example, when the rear surface of the approximate quadrangular tube element is open, during the collision, the approximate quadrangular tube element is compressed in the axial direction of the tube in a state where the rear, opened surface is deformed to widely open the opening, and the approximate quadrangular tube element as a whole is deformed to fall and into a shape protruding in a direction of the front plate. With this process, the element can be stably deformed with respect to various impact loads, and the stability of the shock absorbing property can be improved.

According to another aspect of the present disclosure, the approximate quadrangular tube element has an end plate which closes the tube tip surface, and the end plate faces the back surface of the door trim. The end plate is a plate-shaped member provided to place a lid on the tube tip surface. When the end plate is not provided, during the deformation of the shock absorption, the approximate quadrangular tube element presses the door trim in a line by the U shape forming the side surface. On the other hand, when the end plate is provided, the approximate quadrangular tube element presses the door trim in a plane. Because of this, the transfer of the impact load from the approximate quadrangular tube element to the door trim is distributed over the entirety of the surface, and damages of the door trim such as splitting may be prevented or reduced.

According to another aspect of the present disclosure, a protrusion or a recess is provided on the end plate, and the protrusion or the recess engages a corresponding part provided on the back surface of the door trim, to restrict movement within the back surface of the door trim. When the protrusion is provided on the end plate, a corresponding part such as, for example, a hole and a groove, into which the protrusion is inserted or fitted, is provided on the door trim back surface. Alternatively, when the recess is provided on the end plate, a corresponding part such as a projection, a rib, or the like is provided on the door trim back surface, and is inserted or fitted into the recess. With this structure, when the impact load is applied, in the approximate quadrangular tube element, movement of the door trim back surface is limited, and deformation can quickly be achieved. In addition, because the approximate quadrangular tube element becomes immovable, the form of deformation (deformation mode) of the approximate quadrangular tube element is stabilized.

According to another aspect of the present disclosure, a protruding rib extending in an approximate vertical direction is provided on the end plate as the protrusion, and the protruding rib is inserted into a groove which is the corresponding part provided on the back surface of the door trim, to restrict movement in a horizontal direction within the back surface of the door trim. The protruding rib is a part protruding from the end plate on the side of the door trim, and is formed in a shape extending substantially in the vertical direction. With the protruding rib being inserted into the corresponding structure (such as the groove, the hole, or the like) of the door trim back surface, a sliding movement of the approximate quadrangular tube element in particular in a horizontal direction with respect to the door trim is restricted. A gap may be present between the protruding rib and the corresponding structure of the door trim back surface, or it may be the case that no gap is present and the elements are fitted to each other so that they are immovable.

According to another aspect of the present disclosure, the shock absorber comprises a plurality of the approximate quadrangular tube elements, and all of the approximate quadrangular tube elements have the three side surfaces closed by the upper plate, the lower plate, and the front plate, or all of the approximate quadrangular tube elements have the three side surfaces closed by the upper plate, the lower plate, and the rear plate. By the plurality of approximate quadrangular tube elements deforming in the same direction, the stability of the shock absorbing property can be improved.

According to various aspects of the present disclosure, the shock absorbing property of the shock absorber provided on the vehicle door can be stabilized.

BRIEF DESCRIPTION OF DRAWINGS

Embodiment(s) of the present disclosure will be described by reference to the following figures, wherein.

DESCRIPTION OF EMBODIMENTS

An embodiment of the present disclosure will now be described with reference to the drawings. In the description, in order to facilitate understanding, a specific configuration will be described. The specific configuration, however, merely exemplifies the embodiment, and various other embodiments may be employed.

Figure 1:
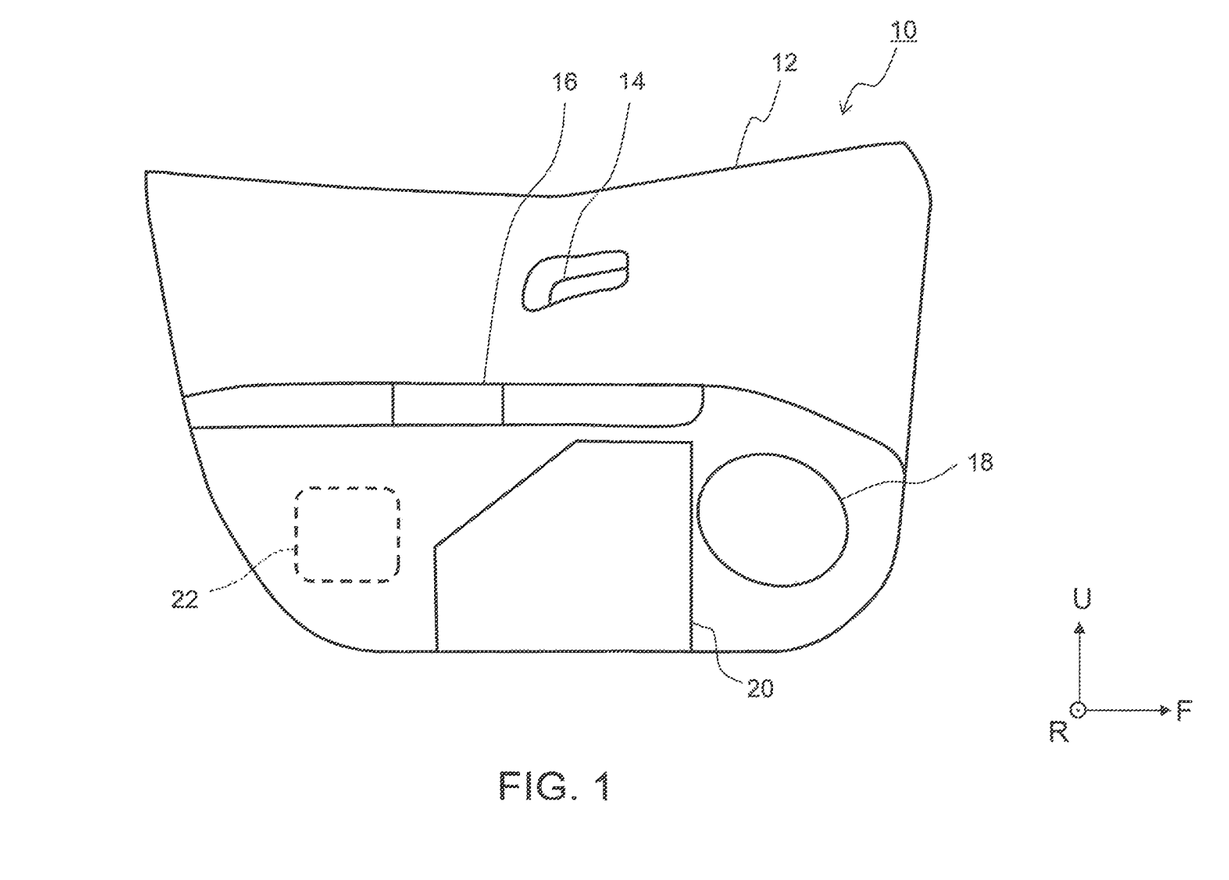
FIG. 1 is a schematic diagram showing a shape of a door trim of a vehicle door.

FIG. 1 is a front view of a door trim 10 according to an embodiment of the present disclosure, viewed from a cabin side. The door trim 10 is used for a door on a left side of the vehicle (door at the left side of a passenger). An R axis direction in the figure (a direction from a back side of the page toward a front side of the page) shows a right side direction of the vehicle. In this example configuration, the R axis direction is from a left outer side in a vehicle width direction toward an inner side (right side of cabin) in the vehicle width direction. An F axis direction shows a vehicle front direction, and a U axis direction shows an upper direction of the vehicle (vertically upward direction). The coordinate system of FIG. 1 is also applicable to FIGS. 2 to 7.

In the door trim 10 shown in FIG. 11 an overall shape is formed by a trim board 12 formed by a resin. A door handle 14 is provided near a center and upper part of the trim board 12, and an arm rest 16 which extends in the horizontal direction is formed at a lower side of the door handle 14. At a lower side of the arm rest 16, a speaker set 18 is provided at a front side, and a door pocket 20 is provided near the center. At a region near the rear side at the lower side of the arm rest 16, a shock absorber 22 is attached to a back surface of the door trim 10 (a surface of the trim board 12 at an outer side in the vehicle width direction). A position where the shock absorber 22 is provided corresponds to a position near a waist of a passenger sitting on a seat.

Figure 2:
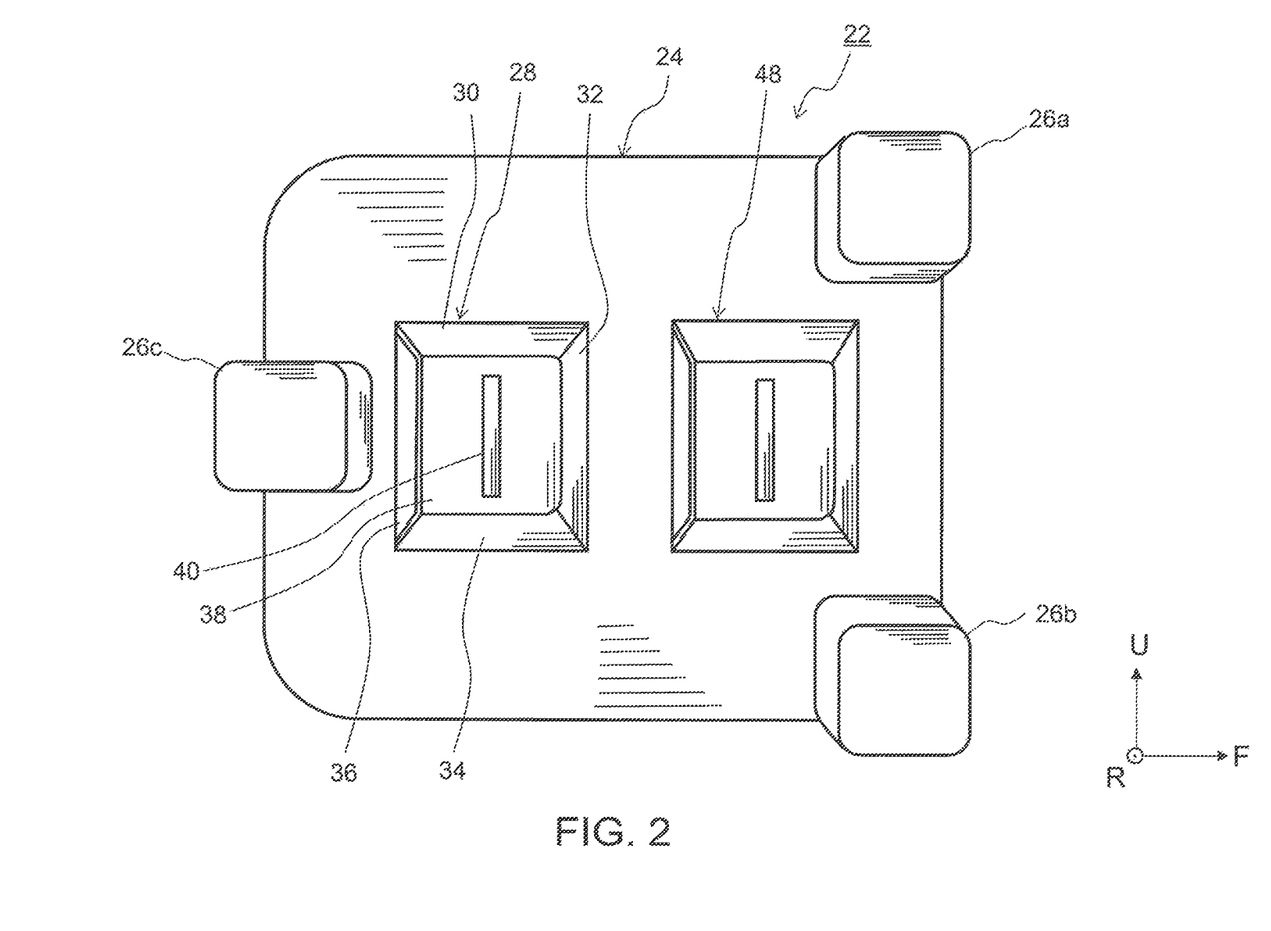
FIG. 2 is a front view of a shock absorber according to an embodiment of the present disclosure, viewed from a cabin side.
Figure 3:
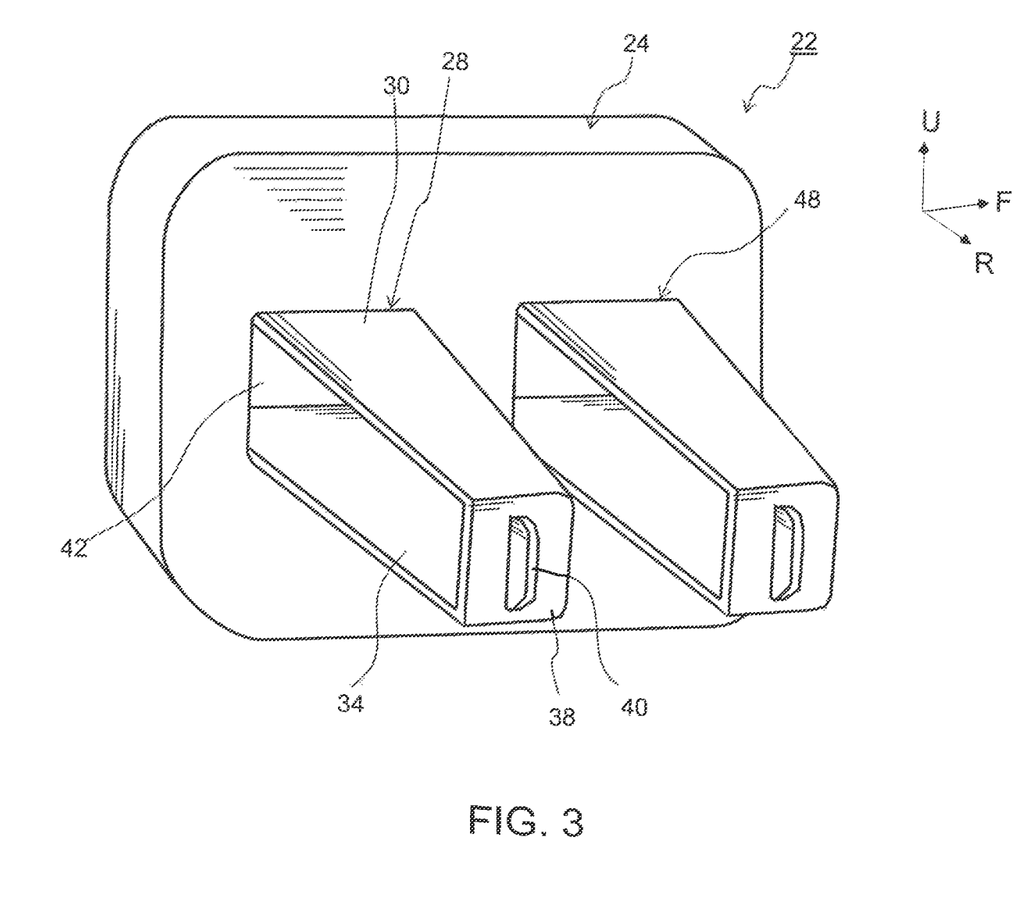
FIG. 3 is a perspective diagram of a shock absorber according to an embodiment of the present disclosure.

With reference to FIGS. 2 and 3, the shock absorber 22 will now be described. FIG. 2 is a front view of the shock absorber 22 viewed from the cabin side, and FIG. 3 is a perspective diagram of the shock absorber 22 viewed from an oblique direction. In FIG. 3, depiction of legs 26a, 26b, and 26c (which are also collectively referred to as legs 26), shown in FIG. 2, is omitted.

The shock absorber 22 is formed by molding a resin having polypropylene as a primary composition. The shock absorber 22 comprises a base 24, the legs 26, and quadrangular tube elements 28 and 48. The base 24 has a thickness of about a few cm in the R axis direction, and is formed in a shape which can be assumed approximately as a square in the FU plane.

Three legs 26 are parts formed protruding from the base 24 in the R axis direction, and are provided near an outer circumference of the base 24. Specifically, the leg 26a is at upper right of the base 24, and extends toward a front direction (F axis direction) and an upward direction (U axis direction) of the vehicle so that the leg 26a slightly expands toward the outer side of the base 24 toward the cabin side (R axis direction in the figures). The leg 26b is at lower right of the base 24, and slightly extends toward the front and downward directions of the vehicle toward the cabin side. The leg 26c is at center left of the base 24, and slightly extends toward the rear side of the vehicle toward the cabin side. Tips (portions closest to the cabin) of these legs 26 are fixed by thermal welding on the back surface of the trim board 12 of the door trim 10. For the specific structures of the legs 26, for example, structures of the related art such as those described in JP 2013-107442 A and JP 2018-69857 A may be employed. A number of the legs 26 in the example configuration of FIG. 2 is 3 due to a placement in the door (not shown), but alternatively, a total of four legs 26 may be formed, one at each of the four corners of the base 24.

The two quadrangular tube elements 28 and 48 are parts formed protruding from the base 24 toward the R axis direction. The quadrangular tube elements 28 and 48 are formed in the same shape, and are provided aligned in the F axis direction near the center of the base 24. The quadrangular tube element 28 is formed such that 3 side surfaces of a polygonal tube are closed by a trapezoidal part formed by 3 plates including an upper plate 30, a front plate 32, and a lower plate 34 formed in such a manner that the width is narrowed toward a tip. Because of this, the upper plate 30 and the lower plate 34 are in a relationship of a truncated chevron shape in which the distance therebetween becomes closer toward the tip side. The remaining, rear side surface is opened entirely, and a large through hole 36 is formed.

At an end of the quadrangular tube element 28 at the side of the base 24, a through hole 42 penetrating through the base 24 in the R axis direction is formed. The through hole 42 is provided in consideration of simplicity in the structure when resin molding for the shock absorber 22 is executed. A tube tip of the quadrangular tube element 28 has a shape which is closed by an end plate 38. Near a center of the end plate 38, a protruding rib 40 extending to the cabin side is provided. The protruding rib 40 is formed in a shape elongated in a perpendicular direction. The quadrangular tube element 48 has a similar structure.

Figure 4:
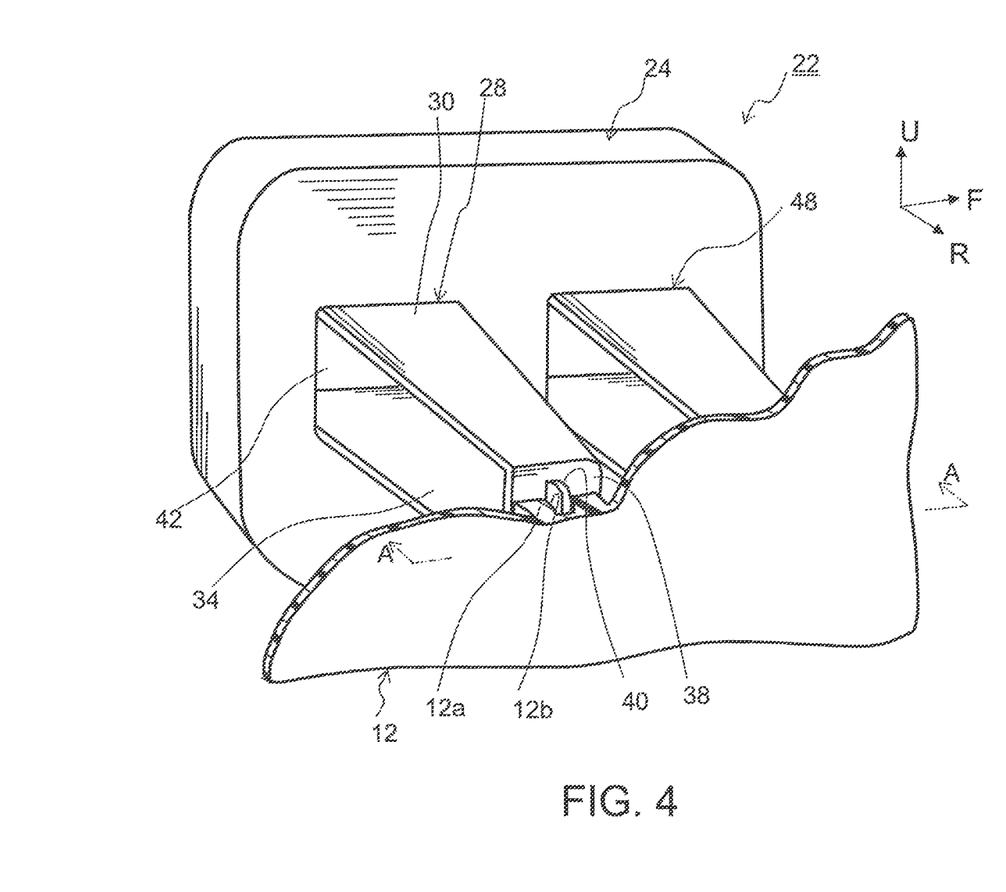
FIG. 4 is a perspective diagram of a state in which a shock absorber is provided on a door trim.

FIG. 4 is a diagram showing a state in which the shock absorber 22 is attached to the trim board 12. In FIG. 4, only a part of the trim board 12 is shown by a broken cross section. The shock absorber 22 is attached to the back surface of the trim board 12 by the tips of the legs 26 (not shown) and the back surface of the trim board 12 being thermally welded.

The end plate 38 of the quadrangular tube element 28 of the shock absorber 22 is placed on the back surface of the trim board 12, facing a boss 12a provided in a slightly protruding manner. Normally, a slight margin is provided between the end plate 38 and the boss 12a. In addition, the protruding rib 40 of the tip of the end plate 38 is inserted into a groove 12b formed on the boss 12a. A slight margin is also provided between the protruding rib 40 and the groove 12b.

Figure 5:
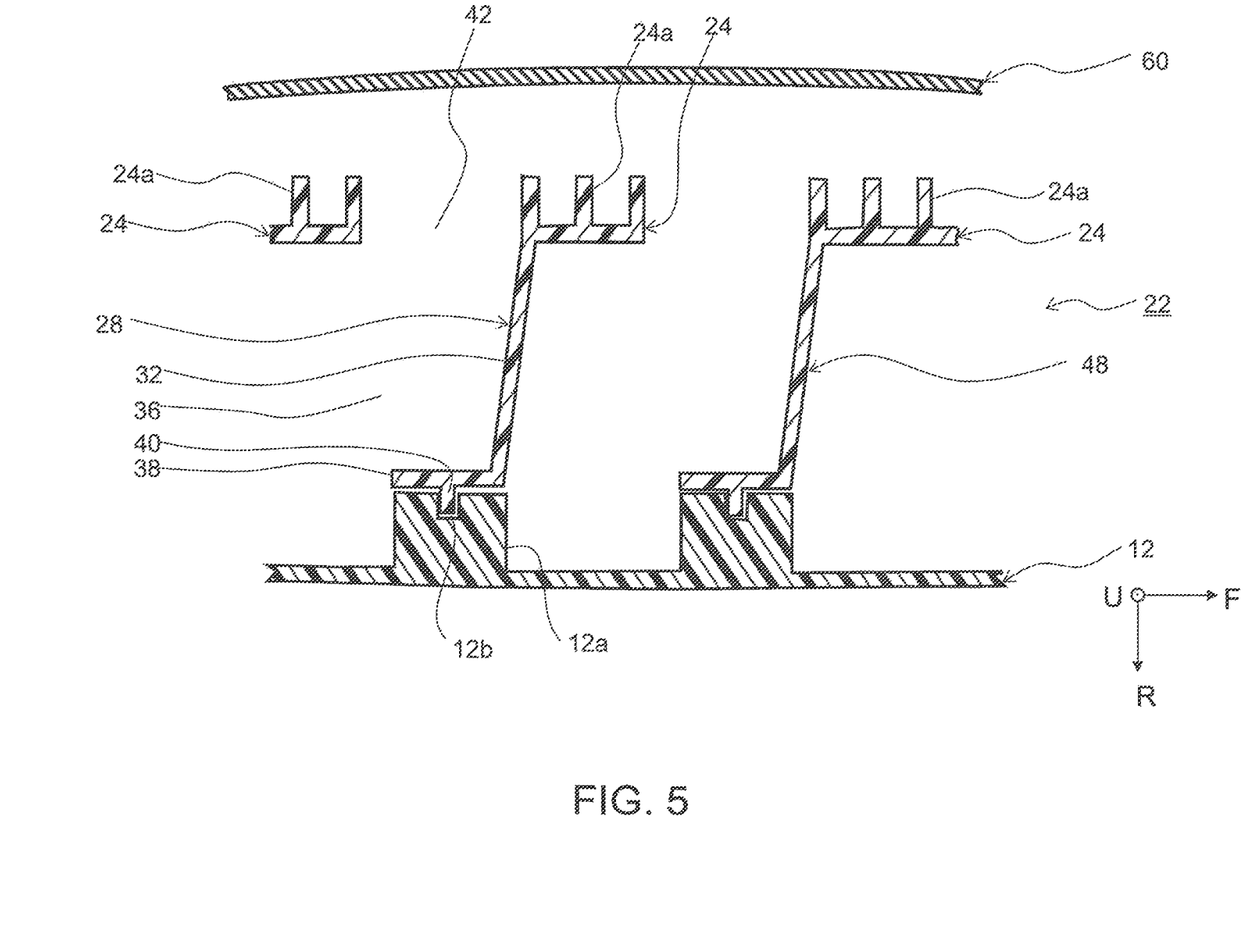
FIG. 5 is an end surface diagram along an AA line of FIG. 4.

FIG. 5 is an end surface diagram along an AA plane of FIG. 4. In FIG. 5, in addition to the trim board 12 and the shock absorber 22, an outer panel 60 of the vehicle door, which is not shown in FIG. 4, is also shown. The outer panel 60 is a plate-shaped member formed by a steel plate, and forms an outer surface of the vehicle door.

The shock absorber 22 is placed at the inner side in the vehicle width direction, distanced from the outer panel 60. On a surface of the base 24 of the shock absorber 22 at the side of the outer panel 60, a plurality of ribs 24a are provided. The ribs 24a are formed in a lattice shape over the entire back surface of the base 24, in order to secure rigidity and distribute the loads. However, as described above, at the end of the quadrangular tube element 28, the through hole 42 is formed on the base 24 due to reasons of resin molding.

In the quadrangular tube element 28, while the front plate 32 is provided, the through hole 36 is formed on the side surface at the rear side, so that the quadrangular tube element 28 is in an opened state. The front plate 32 extends from the surface of the base 24 slightly inclined from the R axis. The end plate 38 provided at the tube tip has a smaller area than the through hole 42 at the other end of the tube.

The end plate 38 faces the boss 12a provided on the back surface of the trim board 12 with a slight distance therebetween. In addition, the protruding rib 40 provided at the tip of the end plate 38 is inserted into the groove 12b formed in the boss 12a. Although there is a slight gap between the protruding rib 40 and the groove 12b, movement of the protruding rib 40 at least in the direction along the F axis (front-and-rear direction of the vehicle) is restricted by the groove 12b.

Next, with reference to FIGS. 6 and 7, there will be described a configuration for shock absorption when the outer panel 60 is deformed due to a side collision of the vehicle and an impact load in the R axis direction is input to the shock absorber 22.

Figure 6:
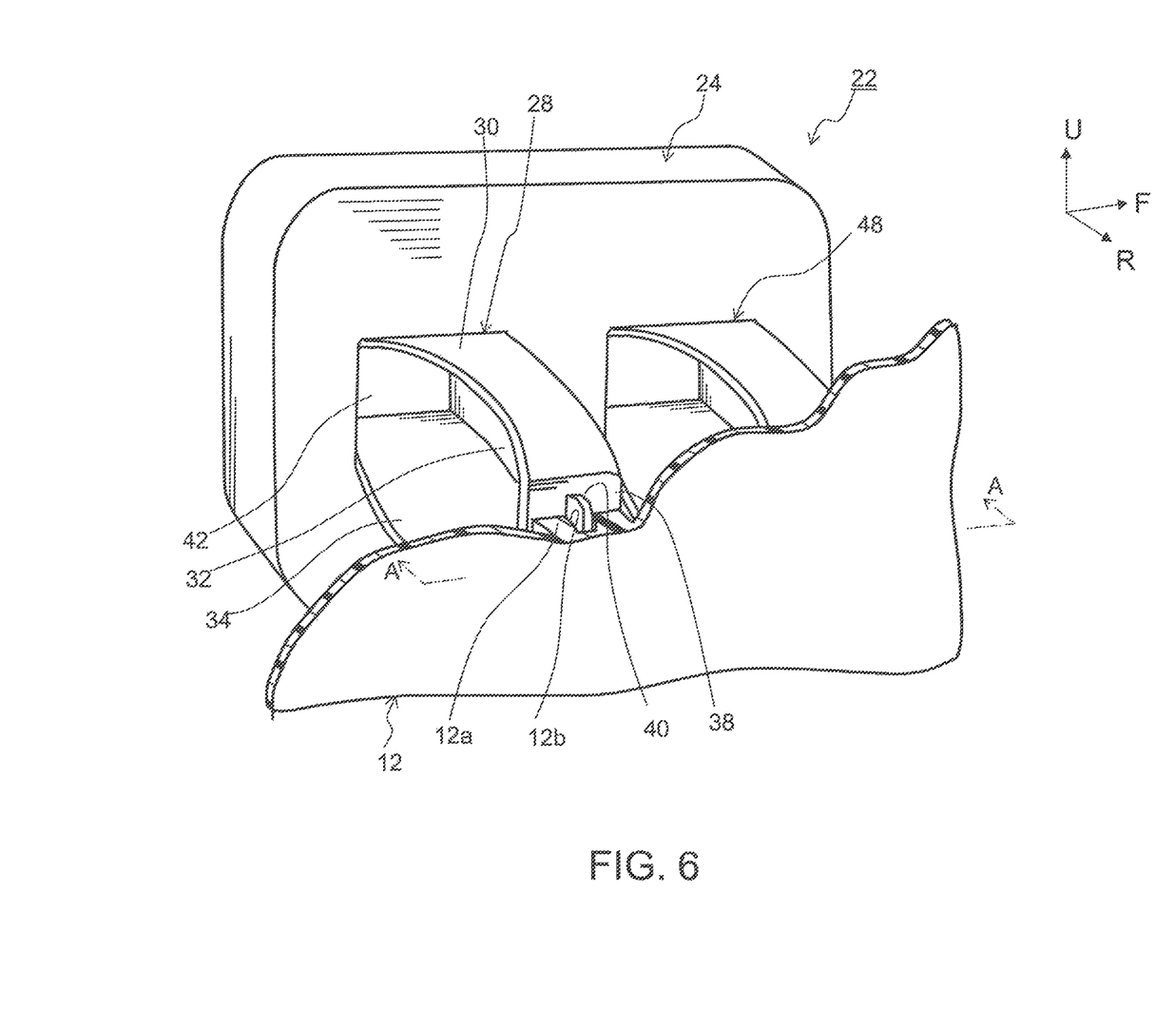
FIG. 6 is a perspective diagram showing a state in which a shock absorber is deformed.

FIG. 6 is a diagram corresponding to FIG. 4, and schematically shows a state in which the shock absorber 22 experiencing the impact load from the outer panel 60 is moved to the side of the cabin (R axis direction). When the base 24 of the shock absorber 22 moves to the side of the cabin, a part of the impact load is transmitted to the trim board 12 through the legs 26 (not shown). With this process, the trim board 12 slightly moves toward the cabin, and transfers a reaction force to the legs 26. With this process, the legs 26 are compressively deformed.

The quadrangular tube elements 28 and 48 contact the trim board 12 at a point of time when the legs 26 are slightly deformed. In the quadrangular tube element 28, as shown in FIG. 6, the end plate 38 is firmly pressed against the boss 12a. Because of this, the impact load from the quadrangular tube element 28 is transferred in a state of being distributed in a plane to the trim board 12, and the damages of the trim board 12 tend to occur less than in a case where the load is transferred in a line. By the transferred impact load, the trim board 12 slightly deforms to the cabin side, and applies a reaction force to the end plate 38. The quadrangular tube element 28 is compressed by the impact load from the base 24 in the R axis direction and the reaction force from the trim board 12 in the negative direction in the R axis.

The quadrangular tube element 28 experiencing the compressive force is deformed first in a manner such that the open surface in which no supporting plate is provided is widely opened. In FIG. 6, the upper plate 30 is deflected to swell at an upper side (U axis direction) and the lower plate 34 is deflected to swell at a lower side. With the deformations of the upper plate 30 and the lower plate 34, the front plate 32 deforms to swell in the F axis direction. As a result, a deformation force is created in the quadrangular tube element 28 to move the quadrangular tube element 28 relatively in the F axis direction with respect to the trim board 12. However, at the tip of the quadrangular tube element 28, the protruding rib 40 is inserted into the groove 12b formed in the boss 12a of the trim board 12, and thus, the quadrangular tube element 28 cannot move from the trim board 12. Because of this, the quadrangular tube element 28 is deformed to protrude in the F axis direction side with respect to the trim board 12, without changing the position of the protruding rib 40.

Figure 7:
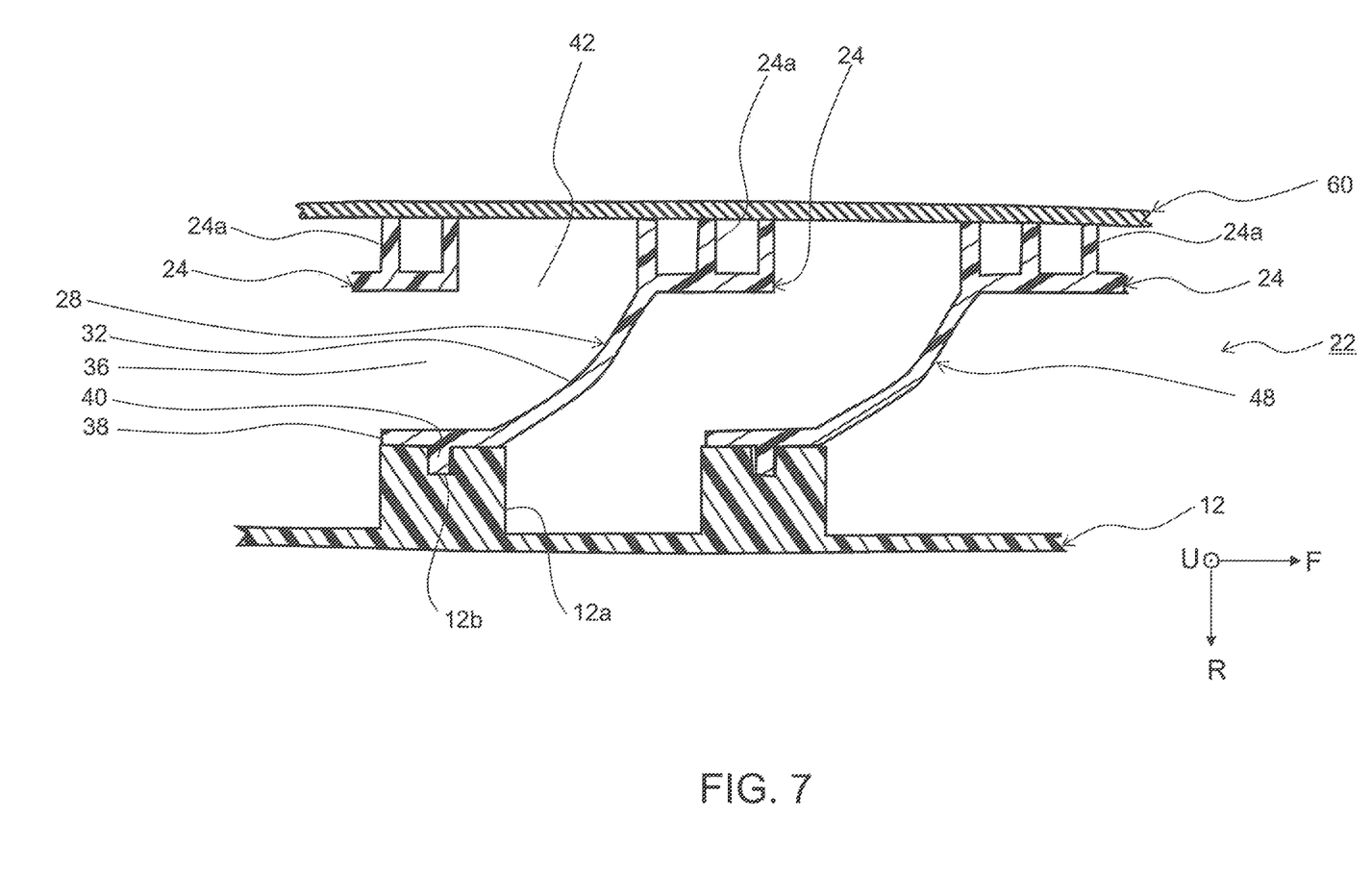
FIG. 7 is an end surface diagram showing a state in which the shock absorber is further deformed.

FIG. 7 is an end surface diagram along an AA line, corresponding to FIG. 5. FIG. 7 shows deformation of the shock absorber 22 at a time which is slightly later than the time depicted by FIG. 6.

As shown in FIG. 7, the shock absorber 22 is significantly fallen in the F axis direction with the front plate 32 of the quadrangular tube element 28 slightly swollen in the F axis direction, in a state where the protruding rib 40 is inserted into the groove 12b of the trim board 12. The base 24 slides the surface of the outer panel 60 in the F axis direction. With this deformation, the shock absorber 22 absorbs the impact force and the impact energy.

When the quadrangular tube element 28 is further deformed, the upper plate 30, the front plate 32, and the lower plate 34 are ruptured, and the three-dimensional structure of the quadrangular tube element 28 is destroyed. Prior to this, the legs 26 are also destroyed because the legs 26 cannot tolerate the compressive force. In this process, the shock absorber 22 absorbs a large impact energy. The specific shock absorbing property of the shock absorber 22 is set according to a load-displacement property which is necessary in the vehicle, and the material, the thickness (cross-sectional area), or the like are determined to satisfy the necessary property.

In the above description, a configuration is described in which the impact load is input in the R axis direction from the outer panel 60 to the shock absorber 22. However, the shock absorber 22 deforms in the above-described manner regardless of the direction of the side collision.

For example, a case will be considered in which the impact load is input from an oblique rear direction of the vehicle; that is, when the shock absorber 22 receives an oblique load directed to the R axis direction and the F axis direction. In this case also, in the shock absorber 22, the quadrangular tube element 28 deforms in a manner as shown in FIG. 6. Further, because an action to press the base 24 in the F axis direction by the outer panel 60 is also applied in the shock absorber 22, the falling in the F axis direction as shown in FIG. 7 is easily caused.

A case in which the impact load is input from the oblique front direction; that is, when the shock absorber 22 receives a slanted load in the R axis direction and the negative direction in the F axis direction, is similar. In the deformation caused in the quadrangular tube element 28 of the shock absorber 22, the action due to the opening of the opened surface because of the presence of the opened surface is dominant over the action by the direction of the load. Because of this, the quadrangular tube element 28 in this case also attempts to fall in the F axis direction. In this process, the base 24 experiences a force to move in the negative direction in the F axis by the outer panel 60, but in general, the deformation force of the quadrangular tube element 28 is stronger, and the shock absorber 22 falls in the F axis direction.

As described, the shock absorber 22 deforms in the deformation shape (which can also be referred to as a deformation mode) shown in FIGS. 6 and 7 regardless of the direction of the impact load, and absorbs the impact. In particular, by placing the upper plate 30 and the lower plate 34 in the truncated chevron shape, the deformation mode tends not to be disturbed even for various impact loads. Because of this, the shock absorbing property (such as a shock absorption amount and shock absorption time) shows high stability regardless of the form of collision of the vehicle.

Finally, a role of the legs 26 will be described. In the shock absorber 22, the legs 26 serve as a part of the shock absorption function, but the quadrangular tube elements 28 and 48 primarily bear the shock absorption function. Therefore, in general, the deformations of the quadrangular tube elements 28 and 48 are not affected by the structure of the legs 26. However, in order to stabilize the deformation of the quadrangular tube elements 28 and 48, it is desirable to avoid a structure which is easily deformed in a direction opposite from the direction of deformations of the quadrangular tube elements 28 and 48. Thus, for example, there may be considered employment of a structure for the legs 26 which has an isotropic deformation property which tends not to deform in a particular direction. Alternatively, there may be considered employment of a structure for the legs 26 which is easily deformed in the same direction as the quadrangular tube elements 28 and 48. As such legs 26, a configuration may be considered in which the legs 26 have the same or a similar structure as those of the quadrangular tube elements 28 and 48, and the open surface is set in the same or approximately the same direction as the quadrangular tube elements 28 and 48. In this case, the shock absorber 22 can be attached to the trim board 12 by thermally welding or the like the tube tip of the quadrangular tube elements of the legs 26 onto the trim board 12.

The invention claimed is:

1. A shock absorber which is attached to a back surface of a door trim of a vehicle door and which absorbs impact applied to the vehicle door, comprising:
an approximate quadrangular tube element having a tube tip surface facing the back surface of the door trim, wherein
the approximate quadrangular tube element has an approximate U shape in which three side surfaces are closed by an upper plate, a lower plate, and a front plate or a rear plate, and a remaining side surface is opened, and an end plate which closes the tube tip surface, and faces the back surface of the door trim, and a protrusion or a recess is provided on the end plate, and the projection or the recess engages a corresponding part provided on the back surface of the door trim, to restrict movement within the back surface of the door trim.

2. The shock absorber according to claim 1, wherein in the approximate quadrangular tube element, the upper plate and the lower plate are formed in an approximate truncated chevron shape in which a distance therebetween becomes smaller toward the tube tip surface.

3. The shock absorber according to claim 1, wherein a protruding rib extending in an approximate vertical direction is provided on the end plate as the projection, and the protruding rib is inserted into a groove which is the corresponding part provided on the back surface of the door trim, to restrict movement in a horizontal direction within the back surface of the door trim.

4. The shock absorber according to claim 1, comprising:

a plurality of the approximate quadrangular tube elements, and all of the approximate quadrangular tube elements have the three side surfaces closed by the upper plate, the lower plat, and the front plate, or all of the approximate quadrangular tube elements have the three side surfaces closed by the upper plate, the lower plate, and the rear plate.

* * * * *